Nov. 20, 1923.  
A. T. McWANE  
PIPE JOINT  
Filed Jan. 15, 1923  
1,474,437  
2 Sheets-Sheet 1

Inventor  
A. T. McWane  
By C. A. Snow & Co.  
Attorneys

Nov. 20, 1923.
A. T. McWANE
PIPE JOINT
Filed Jan. 15, 1923
1,474,437
2 Sheets-Sheet 2
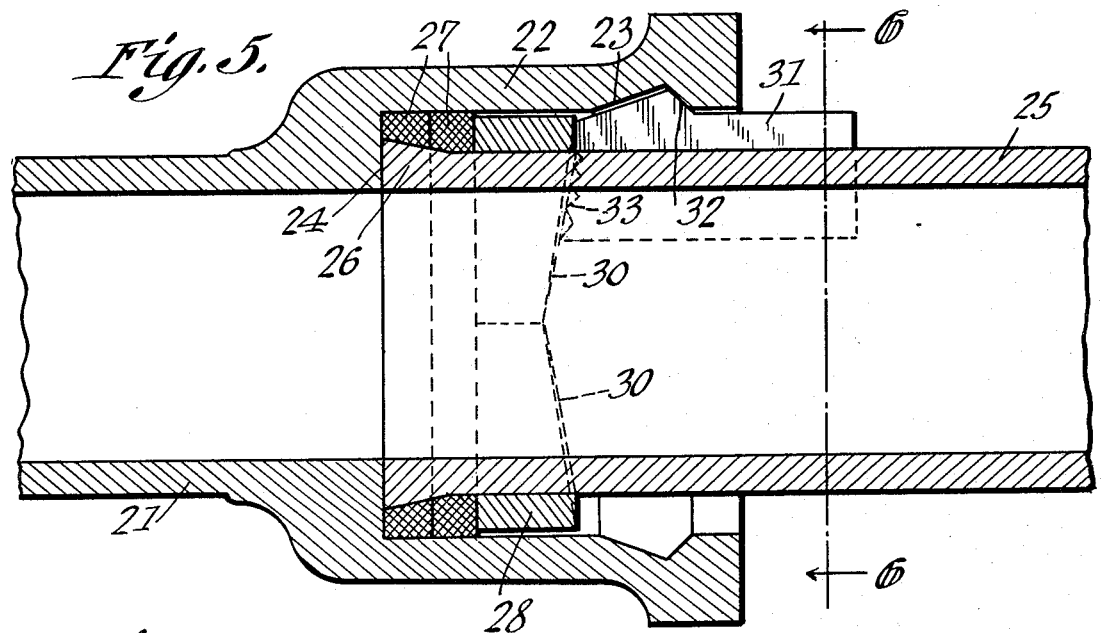
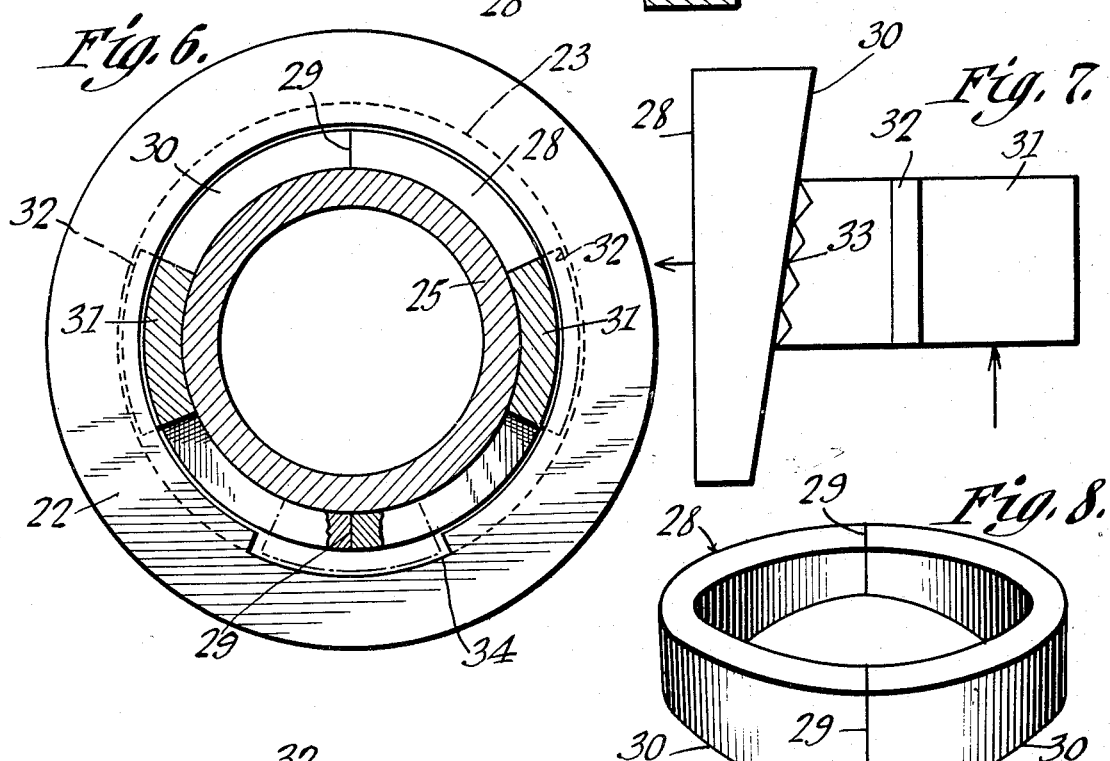

Patented Nov. 20, 1923.

1,474,437

UNITED STATES PATENT OFFICE.

ARTHUR T. McWANE, OF BIRMINGHAM, ALABAMA.

PIPE JOINT.

Application filed January 15, 1923. Serial No. 612,749.

*To all whom it may concern:*

Be it known that I, ARTHUR T. McWANE, a citizen of the United States, residing at Birmingham, in the county of Jefferson and State of Alabama, have invented a new and useful Pipe Joint, of which the following is a specification.

Broadly considered, it is one object of this invention to supply a simple mechanism for packing the joints of a bell and spigot pipe, and for retaining the packing, the structure being applicable to a standard form of bell and spigot cast iron pipe, without working any changes in the standard construction of the pipe.

The invention aims, further, to provide a novel form of anchorage, and to provide novel means for advancing a compression member, so that the same will engage and compress the packing. A further object of the invention is to provide novel means for maintaining the anchors engaged with one section of the pipe.

It is within the province of the disclosure to improve generally and to enhance the utility of devices of that sort to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
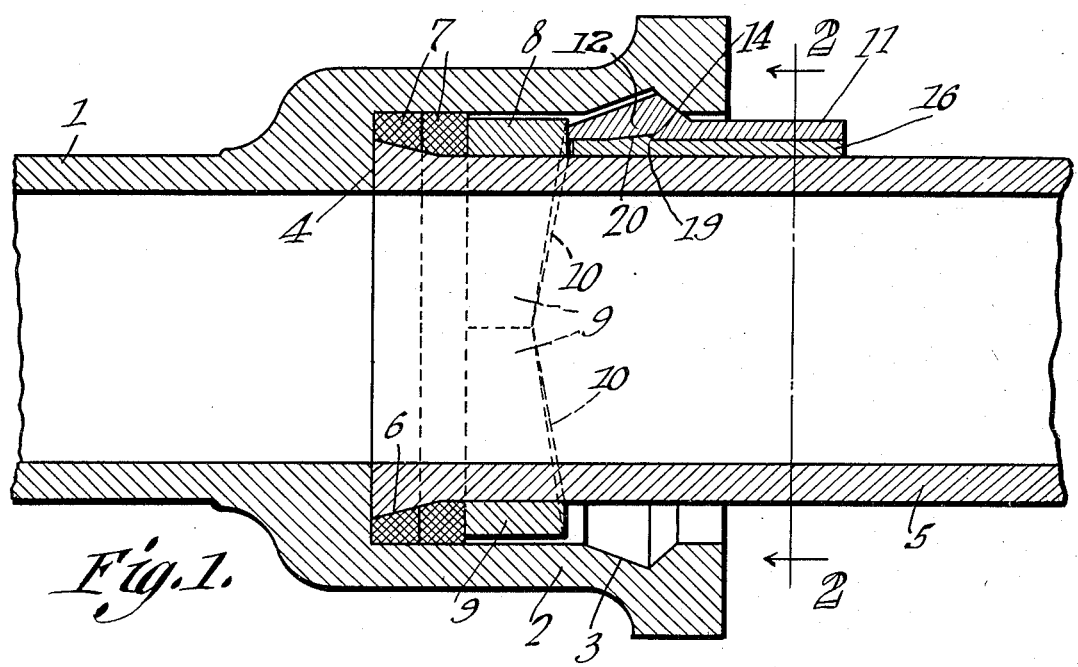
Figure 2:
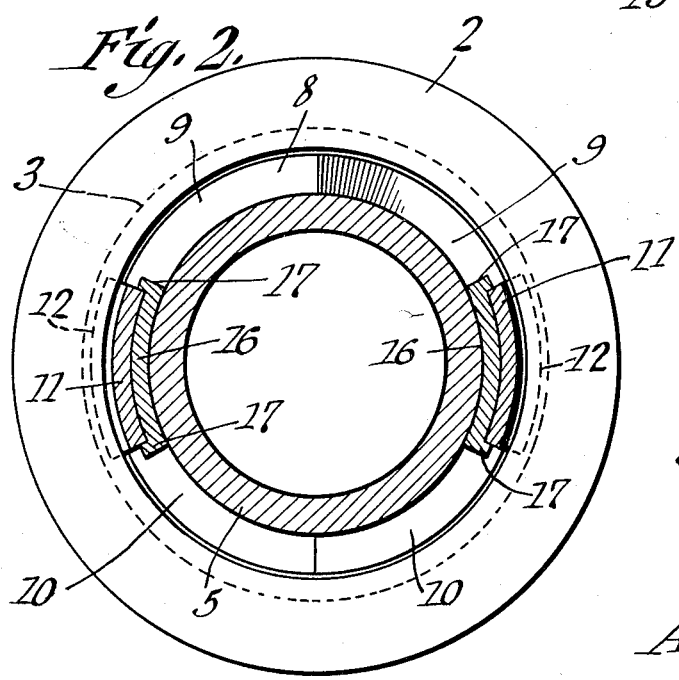
Figure 3:
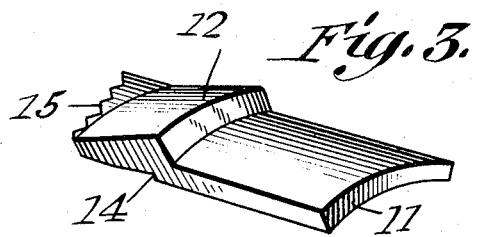
Figure 4:
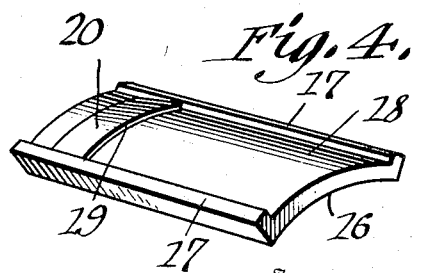

Figure 1 shows in longitudinal section, a device constructed in accordance with the invention; Figure 2 is a cross section on the line 2—2 of Figure 1; Figure 3 is a perspective view showing one of the anchors; Figure 4 is a perspective view disclosing one of the keys; Figure 5 is a longitudinal section showing a modified form of the invention; Figure 6 is a cross section on the line 6—6 of Figure 5; Figure 7 is a diagrammatic view illustrating the operative relation between the anchor and the compression member; Figure 8 is a perspective view of the compression member; and Figure 9 is a perspective view depicting one of the anchors.

Referring to Figures 1, 2, 3 and 4, the numeral 1 marks a pipe, which may be denominated a first pipe, the same having a bell 2 provided with an internal circumferential seat 3, there being a shoulder 4 in the bell 2 of the pipe 1. The numeral 5 designates a second pipe, equipped at its inner end with an annular inclined rib 6, the end of the second pipe 5 being received in the bell 2 of the first pipe 1, in abutment with the shoulder 4. It will be understood, that, in practice, that end of the pipe 5 which is not shown may be provided with a bell, like the part 2, that end of the pipe 1 which is not shown being provided, if desired, with a part like the rib 6.

A packing of any desired sort, marked by the numeral 7, abuts against the shoulder 4 and is located about the inner end of the second pipe 5, in cooperating relation to the rib 6. A compression member 8, preferably in the form of a ring, surrounds the pipe 5 and is located within the bell 2, in abutment with the packing 7. For convenience in placing the compression member 8 about the second pipe 5, the compression member may be divided into laterally separable parts, designated by the numeral 9, the parts of the compression member or ring being supplied with cam edges 10.

Anchors 11 extend into the bell 2 and have external transverse shoulders 12 received in the seat 3 of the bell 2, each anchor 11 having an internal transverse shoulder 14. At their inner ends, the anchors 11 are supplied with teeth 15 located in a line at an angle to the axis of each anchor 11, so as to cooperate properly with the cam edge 10 of the compression member or ring 8.

Keys 16 are provided and are interposed between the anchors 11 and the second pipe 5. On their outer surfaces, the keys 16 are equipped with longitudinal flanges 17 defining a groove 18 receiving the anchor 11. On its outer surface, each key 16 has a transverse projection 19, adapted to cooperate with the internal shoulder 14 of the corresponding anchor 11, the projection 19 including a longitudinally inclined surface 20.

In practical operation, the end of the second pipe 5 is introduced into the bell 2 of the first pipe 1, as shown in Figure 1, the packing 7 being disposed about the inclined rib 6 of the section 5 of the pipe, within the bell 2 of the pipe 1. The compression member 8 then is mounted in place in abutment with the packing 7, about the pipe 5 and within the bell 2. The anchors 11 are inserted longitudinally into the bell 2. The keys 16 then are slid into place between the anchors 11 and the second pipe 5, the anchors fitting slidably in the grooves 18 of the keys 16. The inclined surfaces shown at 20 facilitate the introduction of the keys 16, and when the keys are in place, the transverse projections 19 of the keys interlock with the internal shoulders 14 of the anchors 11, the anchors and the keys thus being held together against relative longitudinal movement. The keys 16 serve to move the anchors 11 outwardly, in a radial direction, thereby causing the external shoulders 12 of the anchors to engage in the seat 3 of the bell 2, as shown in Figure 1. The anchors 11 and the keys 16 are driven downwardly, circumferentially of the pipes, in a way which will be manifest when Figure 2 is examined, the anchors cooperating with the cam edges 10 of the compression member 8 and advancing the compression member, the compression member causing the packing 7 to be compressed between the rib 6 of the pipe 5 and the inner wall of the bell 2 of the pipe 1, a tight joint being afforded. The teeth 15 on the anchors 11 serve to hold the anchors on the compression member 8, against retrograde movement.

The device, generally considered is so constructed that the time-consuming and expensive operation involved in leading a pipe joint will be avoided.

In Figures 5 to 9, there is shown a first pipe 21 having a bell 22 provided with an internal seat 23, the bell having an internal transverse shoulder 24. The second pipe appears at 25 and the inclined rib thereof is marked by the numeral 26. The packing is shown at 27 and the compression member 28 is of the form hereinbefore described, the compression member being in the shape of a ring which is divided as at 29, the compression member having a cam edge 30. The anchors are shown at 31 and each anchor has an external shoulder 32 coacting with the seat 23. The teeth on the anchors are located as hereinbefore set forth and are designated by the numeral 33. A longitudinal passage 34 is formed in the end of the bell 22 so that the anchors 31 may be inserted endwise into the bell and then be moved circumferentially, as and for the purpose hereinbefore specified, the general operation of the device shown in Figures 5 and 9 being understood clearly, in view of what has been stated hereinbefore concerning that form of the invention shown in Figures 1 to 4.

What is claimed is:—

1. In a device of the class described, a first pipe having a bell provided with an internal circumferential seat; a second pipe received in the bell; a compression member about the second pipe and located in the bell, the compression member having a cam edge; and anchors mounted between the bell and the second pipe for movement circumferentially thereof and cooperating with the cam edge of the compression member, the anchors having shoulders received slidably in the seat of the bell.

2. In a device of the class described, a first pipe having a bell, a second pipe in the bell, a compression member between the bell and the second pipe, and an anchor located between the second pipe and the bell, the anchor and the compression member having cooperating cam parts which serve to advance the compression member when the anchor is moved circumferentially of the bell, the compression member and the bell being provided with coacting parts which hold the anchor in the bell for movement circumferentially thereof.

3. A device of the class described, constructed as set forth in claim 2 and further characterized by the provision of a key located between the anchor and the second pipe, the anchor and the key having interengaging elements which coact to prevent relative longitudinal movement between the anchor and the key.

In testimony that I claim the foregoing as my own, I have hereto affixed my signature in the presence of two witnesses.

ARTHUR T. McWANE.

Witnesses:
FRANK M. BARKER,
Mrs. T. J. LYONS, Jr.